（12）United States Patent
Weber

(10) Patent No.: US 10,308,834 B2
(45) Date of Patent: Jun. 4, 2019

(54) UV CURABLE COATING COMPOSITIONS CONTAINING ALIPHATIC URETHANE ACRYLATE RESINS

(71) Applicant: Eileen M. Weber, Evansville, IN (US)

(72) Inventor: Eileen M. Weber, Evansville, IN (US)

(73) Assignee: Red Spot Paint & Varnish Co., Inc., Evansville, IN (US)

( * ) Notice: Subject to any disclaimer, the term of this patent is extended or adjusted under 35 U.S.C. 154(b) by 1 day.

(21) Appl. No.: 15/997,658

(22) Filed: Jun. 4, 2018

(65) Prior Publication Data

US 2018/0340093 A1    Nov. 29, 2018

Related U.S. Application Data

(63) Continuation of application No. 14/828,814, filed on Aug. 18, 2015, now Pat. No. 9,988,556, which is a continuation of application No. 12/130,387, filed on May 30, 2008, now Pat. No. 9,109,139.

(51) Int. Cl.

| | |
|---|---|
| *C09D 175/16* | (2006.01) |
| *C08K 5/3465* | (2006.01) |
| *C08K 5/17* | (2006.01) |
| *C08F 290/06* | (2006.01) |
| *C08G 18/78* | (2006.01) |
| *C08G 18/79* | (2006.01) |
| *C09D 133/14* | (2006.01) |
| *C08L 33/14* | (2006.01) |

(52) U.S. Cl.
CPC .......... *C09D 175/16* (2013.01); *C08F 290/06* (2013.01); *C08F 290/061* (2013.01); *C08F 290/067* (2013.01); *C08G 18/7887* (2013.01); *C08G 18/792* (2013.01); *C08K 5/17* (2013.01); *C08K 5/3465* (2013.01); *C09D 133/14* (2013.01); *C08L 33/14* (2013.01); *C08L 2205/02* (2013.01)

(58) Field of Classification Search
CPC . C09D 133/14; C09D 175/16; C08F 290/067; C08G 18/7887; C08G 18/792; C08K 5/17; C08K 5/3465; C08L 2205/02; C08L 33/14
USPC ..................................... 522/90, 96
See application file for complete search history.

(56) References Cited

U.S. PATENT DOCUMENTS

| | | | |
|---|---|---|---|
| 5,260,361 A | 11/1993 | Fukushima et al. | |
| 5,401,348 A | 3/1995 | Oguchi et al. | |
| 5,571,570 A | 11/1996 | Lake | |
| 5,571,571 A | 11/1996 | Musaka et al. | |

(Continued)

FOREIGN PATENT DOCUMENTS

| | | |
|---|---|---|
| DE | 10 2006 04786 | 4/2007 |
| JP | H02-032133 | 2/1990 |

(Continued)

OTHER PUBLICATIONS

Radcure. TM. Energy Curable Resins. Product Guide—Coatings and Inks. From Cytec 2011. [online]. [retrieved on Jan. 12, 2011]. Retrieved from Internet URL https://www.cytec.com/uv/Downloads/Racure_Product%20Guide_US_2011.pdf.>.

*Primary Examiner* — Sanza L. McClendon
(74) *Attorney, Agent, or Firm* — King & Partners, PLC

(57) ABSTRACT

Described in preferred embodiments are UV curable coating compositions including a unique blend of aliphatic urethane acrylate resins. Also described are coated articles and methods for their production involving the use of the coating compositions.

4 Claims, 1 Drawing Sheet

(56) References Cited

U.S. PATENT DOCUMENTS

| | | | |
|---|---|---|---|
| 5,658,672 | A | 8/1997 | Lenke et al. |
| 6,191,181 | B1 | 2/2001 | Weikard et al. |
| 6,258,441 | B1 | 7/2001 | Oguchi et al. |
| 6,306,502 | B1 | 10/2001 | Fukushima et al. |
| 6,316,515 | B1 | 11/2001 | Lake |
| 6,632,535 | B1 | 10/2003 | Buazza et al. |
| 9,109,139 | B2 | 8/2015 | Weber |
| 2006/0079660 | A1 | 4/2006 | Ludewig et al. |
| 2006/0106157 | A1 | 5/2006 | Sawant et al. |
| 2006/0205911 | A1 | 9/2006 | Ludewig et al. |
| 2007/0231577 | A1 | 10/2007 | Caillouette et al. |
| 2014/0186758 | A1 | 7/2014 | Bellino et al. |

FOREIGN PATENT DOCUMENTS

| | | |
|---|---|---|
| JP | H04-226516 | 8/1992 |
| JP | H09-157315 | 6/1997 |
| JP | 2000-154230 | 6/2000 |
| JP | 2003-238845 | 8/2003 |
| JP | H07-252333 | 10/2007 |
| WO | WO 92/17337 | 10/1992 |
| WO | WO 92/17536 | 10/1992 |
| WO | WO 06/028518 | 3/2006 |

UV CURABLE COATING COMPOSITIONS CONTAINING ALIPHATIC URETHANE ACRYLATE RESINS

This application is a continuation of U.S. patent application Ser. No. 14/828,814, filed Aug. 18, 2015 entitled "UV Curable Coating Compositions Containing Aliphatic Urethane Acrylate Resins," which is a continuation of U.S. patent application Ser. No. 12/130,387, filed May 30, 2008, now U.S. Pat. No. 9,109,139 entitled "UV Curable Coating Compositions Containing Aliphatic Urethane Acrylate Resins," which are hereby incorporated herein by reference in their entirety, including all references cited therein.

BACKGROUND

The present invention relates generally to forming polymeric coatings on substrates, and in certain embodiments to coating compositions, coated articles, and methods for their production, that involve the use of a blend of selected types of resins.

As further background, plastic substrates such as but not limited to polycarbonate, acrylic and polyester often are used in a variety of applications as replacements for more traditional materials such as glass. Plastics can offer excellent properties such as impact resistance and optical clarity while providing weight reduction and abundant design flexibility. Despite the numerous benefits that plastic offers, they have a major drawback in that they often do not provide the desired degree of chemical, scratch, mar and abrasion resistance, UV resistance and/or exterior durability.

It is known that both conventional thermal cured and ultraviolet (UV) cured coatings for exterior applications exhibiting scratch and abrasion resistance have offered adequate protection and performance of these various plastic substrates when direct exposure angles or durations are limited. It is also known that UV cured coatings are often the preferred coating of choice because they offer distinct advantages such as improved cycles times and reduced work in process over conventionally cured alternatives.

Despite the many advantages of current exterior coatings—and more specifically of UV curable coatings—they still do not meet the all expectations and often lack desirable properties and combinations of properties that are very difficult to achieve with traditionally available technology. Traditional UV topcoats for scratch and abrasion resistant applications most often are comprised primarily of high functionality and highly reactive acrylates. Although these characteristics impart the desired hardness properties, they are prone to cured resin shrinkage and steric hindrance. The steric hindrance results in a higher than desired number of unreacted acrylate bonds in the cured polymer resin which make the cured coating more susceptible to premature UV and environmental degradation. Additionally, known UV topcoats upon curing create a rigid, inflexible coating. Such inflexible coatings when subjected to conditions of expansion or contraction during processing or field use or when applied to materials containing high internal stress result in inadequate performance such as cracking, compromised exterior durability or other imperfections. Thus it can be difficult for a single coating composition to provide the desired level of a high surface hardness, scratch resistance, chemical resistance, UV resistance and exterior durability.

In preferred embodiments, the present invention addresses the need for UV curable coatings that along with high scratch and abrasion resistance offer properties of improved exterior durability, UV stability, thermal stability and flexibility especially for design applications that subject the coated material to strenuous environments. Additionally, the current invention describes the processes for using these materials and the resulting coated articles.

SUMMARY

In certain aspects, the invention provides a coating composition that includes a unique blend of UV-curable resins. A first resin of the blend is an aliphatic urethane acrylate formed by the reaction of an aliphatic polyisocyanate component containing iminooxadiazine dione, isocyanurate, uretdione, urethane, allophanate, biuret or oxadiazine trione groups, with an alcohol component, for example with a molecular weight of about 100 to about 2000 g/Mol, and containing at least one monobasic, hydroxyl-functional linear or branched alkyl ester of meth(acrylic) acid. This coating composition also includes at least a second aliphatic urethane acrylate, which in certain embodiments (i) is formed by the reaction of a multifunctional acrylate with an aliphatic urethane based on a polymer of alkyl carbomonocycle diisocyanate; or (ii) is encompassed by Formula II as disclosed hereinbelow. In preferred aspects, the first aliphatic urethane acrylate has a molecular weight in the range of about 800 to about 2500 g/Mol, and/or the first aliphatic urethane acrylate contains about 3 to about 5 polymerizable acrylate groups per molecule. In preferred aspects, the molecular weight of the second aliphatic urethane acrylate is in the range of about 500 to about 2000 g/Mol. The coating compositions can also contain a solvent that assists in controlled application and processing of the material. The coating compositions can also contain at least two and more preferably three or more multifunctional acrylates each having molecular weights between 170 and 1000 and a minimum of two polymerizable unsaturated groups per molecule. The coating compositions can also include stabilizers such as hindered amine light stabilizers and/or UV absorbers of the benzotriazole or benzotriazine families, or derivatives thereof. The coating compositions can also contain one or more organic-inorganic hybrid materials synthesized through a sol gel process.

In additional embodiments, the present invention provides coated articles and coating processes involving the use of the coating compositions described herein. In certain forms, an inventive coated article will have a base plastic material having a thickness of about 0.75 to 20 mm, and a cured top coating formed by reaction of a coating composition as described herein and having a thickness in the range of about 3 to about 35 microns. The cured top coating can provide a high degree of scratch, abrasion, mar and chemical resistance along with superior UV resistance, exterior durability and thermal stability. In certain forms, inventive processes will include the application of a coating composition as described herein by spray coat, flowcoat or curtain coat techniques.

Additional embodiments of the present invention as well as features and advantages thereof will be evident from the descriptions herein.

DETAILED DESCRIPTION

Figure 2:
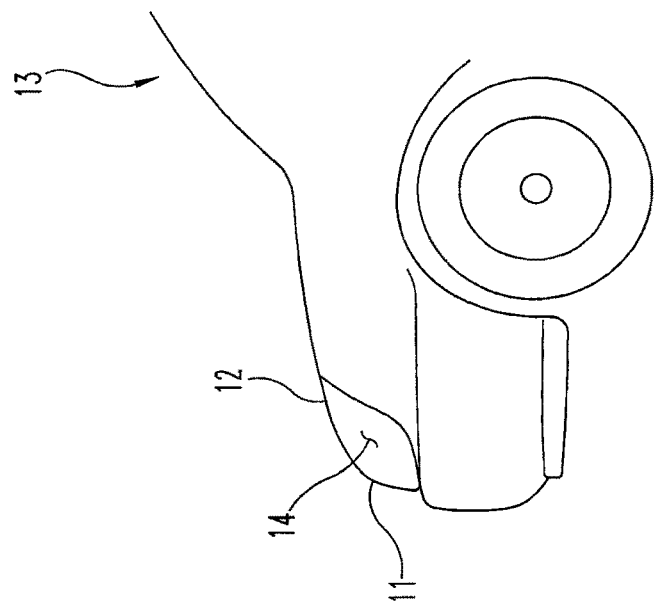
FIG. 2 provides a side partial cutaway illustration of the vehicle of FIG. 1.

For the purposes of promoting an understanding of the principles of the invention, reference will now be made to certain embodiments and specific language will be used to describe the same. It will nevertheless be understood that no limitation of the scope of the invention is thereby intended, such alterations and further modifications in the illustrated device, and such further applications of the principles of the invention as described herein being contemplated as would normally occur to one skilled in the art to which the invention relates.

As disclosed above, in certain of its aspects, the present invention relates to unique coating compositions and to methods and coated articles that employ or include the coating compositions. In preferred forms, coating compositions include a novel blend of resins, the blend including first and second acrylated aliphatic urethane resins. Such coating compositions include at least a first urethane acrylate resin which is formed by the reaction of an aliphatic polyisocyanate component containing iminooxadiazine dione, isocyanurate, uretdione, urethane, allophanate, biuret or oxadiazine trione groups with an alcohol component containing at least one monobasic, hydroxyl-functional linear or branched alkyl ester of meth(acrylic) acid.

In preferred forms, the first urethane acrylate resin has a molecular weight between about 800 and about 2500 g/Mol. More preferably, the first acrylated aliphatic urethane has a molecular weight of about 1000 to about 1600 g/Mol, with a molecular weight of about 1400 g/Mol being the most preferred in work to date. The alcohol component used in the formation of the first urethane acrylate resin can have a molecular weight of about 100 to about 2000 g/Mol. As would be understood, molecular weights for polymerizable resins given herein are number average molecular weights unless specified otherwise. In certain variants, the first urethane acrylate can be the reaction product of:

(a) a polyisocyanate component containing from 20 to 100 mole %, based on the moles of the polyisocyanate component, of iminooxadiazine dione group-containing polyisocyanate trimers encompassed by the formula I:

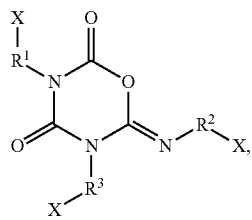

I wherein:
$R^1$, $R^2$ and $R^3$ of formula I are the same or different and represent linear or branched, $C_4$-$C_{20}$ (cyclo)alkyl groups, and X is the same or different and represents isocyanate groups or isocyanate group-containing radicals that also contain iminooxadiazine dione, isocyanurate, uretdione, urethane, allophanate, biuret or oxadiazine trione groups, wherein $R^1$, $R^2$ and $R^3$ of formula I are attached to a nitrogen atom, with b) an alcohol component containing at least one monobasic, hydroxy-functional, linear or branched $C_1$-$C_{12}$ alkyl ester of (meth)acrylic acid. Additional information concerning such urethane acrylate resins suitable for use in the present invention is found in U.S. Pat. No. 6,191,181, which is hereby incorporated herein by reference in its entirety, including for its disclosure of preparative methods and final urethane acrylate resin compounds that can be used in the present invention.

In certain embodiments, the first urethane acrylate has a functionality of about 2 to about 6, more preferably about 3 to about 5, and most preferably about 3.5 to about 4. In addition or alternatively, the first urethane acrylate can exhibit the capacity for ultraviolet radiation curing to provide a hard coating, for example having a pencil hardness above 4, e.g. about 4 to about 7.

The first aliphatic urethane acrylate resin can be provided alone or can be provided admixed with one or more reactive diluents, for example HDDA (1,6 Hexanediol diacrylate), TPGDA (tripropyleneglycol diacrylate), DPGDA (dipropyleneglycol diacrylate), TMPTA (trimethylolpropane triacrylate), and/or GPTA (glycerolpropoxy triacrylate). When admixed with one or more reactive diluents, the first aliphatic urethane acrylate resin can constitute about 70% to about 90% of the mixture in certain embodiments.

Suitable resins for use as the first urethane acrylate resin include, as examples, Desmolux VP LS2308, Desmolux XP2609, Desmolux LP WDJ 4060 (Bayer Material Science, Pittsburgh Pa.), and RX5503, RX04788 and IRR 598 (Cytec Surface Specialties, Smyrna, Ga.).

In certain embodiments, the coating compositions of the invention also include a second urethane acrylate resin different from the first urethane acrylate resin. The second urethane acrylate resin can be formed by the reaction of a multifunctional acrylate (e.g. with a molecular weight of about 190 to about 500 and containing at least three polymerizable unsaturated groups per molecule) with an aliphatic urethane based on a polymer of alkyl carbomonocycle diisocyanate with alkanepolyol polyacrylates. In certain embodiments, the second urethane acrylate resin is encompassed by the formula II:

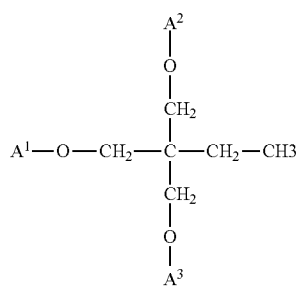

II wherein $A^1$, $A^2$, and $A^3$ are each a group of the formula III:

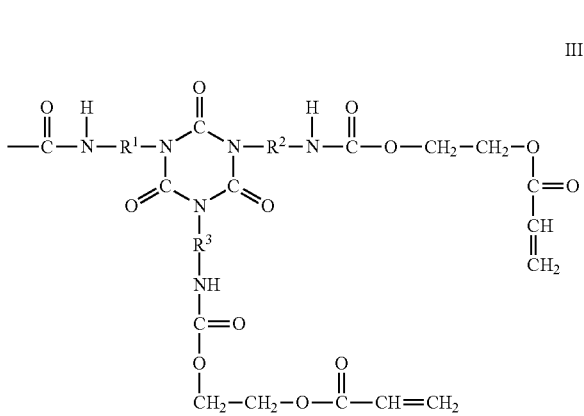

III wherein $R^1$, $R^2$, and $R^3$ of formula III, which can be the same or different, are each a linear aliphatic group having from 2 to about 12 carbon atoms, or a cycloaliphatic group having from 4 to about 12 carbon atoms. $R^1$, $R^2$, and $R^3$ of formula III are each preferably an alkylene group having from 2 to about 12 carbon atoms. Compounds of Formula II can be prepared, for example, as described in U.S. Pat. No. 5,658, 672, which is hereby incorporated herein by reference in its entirety, including for its disclosure of preparative methods and of final compounds encompassed by formula II above that may be used in the present invention. This '672 patent teaches that Ebecryl 8301 is a blend including a diluent and a hexafunctional acrylate oligomer according to formula II in a weight ratio of about 48:52, respectively, with the diluent being (ethylene-/diethylene glycol diacrylate (based on hydroxyethylacrylate), mostly ethylene glycol diacrylate.

Preferably, the second urethane acrylate resin has a molecular weight in the range of about 500 to about 2000 g/Mol, more preferably about 800 to about 1000 g/Mol, and most preferably to date about 800 g/Mol. In certain embodiments, the second urethane acrylate has a functionality of about 2 to about 10, more preferably about 4 to about 8, and most preferably about 6. Suitable resins for use as this second urethane acrylate resin include, as examples, Ebecryl 8301, Ebecryl 1290, Ebecryl 5129 (Cytec Surface Specialties, Smyrna, Ga.), Ebecryl 1290K, (Diacel-Cytec Company Ltd, Tokyo, Japan) and CN968 (Sartomer Company, Exton, Pa.).

As disclosed above, certain embodiments of the invention relate to coating compositions which include a blend of resins including a first urethane acrylate resin as discussed above and a second urethane acrylate resin as discussed above. In preferred such embodiments, exclusive of any inert solvent present in the composition, the first urethane acrylate resin constitutes about 10% to about 40% by weight of the composition. More preferably in such embodiments, exclusive of any inert solvent present, the first urethane acrylate resin makes up about 10% to about 30% of the composition, even more preferably about 15 to about 25%. As to the second urethane acrylate resin, exclusive of any solvent present, it preferably constitutes about 20% to about 50% by weight of the coating composition, more preferably about 25 to 35%.

In other embodiments of the invention defined herein, the first urethane acrylate resin and the second acrylate resin are included in the coating composition in a weight ratio, or in a molecular ratio, of about 1:10 to about 10:1, respectively, more preferably about 1:5 to 5:1, and most preferably about 1:3 to about 3:1. In certain specified embodiments, the first and second urethane acrylate resins will be present in a weight ratio, or in a molecular ratio, of about 1:2 to about 2:1, respectively.

When included in a blended resin coating composition, the first and second urethane acrylate resins can provide preferred compositions which form UV-cured coatings of with a high degree of surface hardness as measured with steel wool per FMVSS108 and taber abrasion per ASTM D1044. Additionally, preferred blended coatings including these urethane acrylates provide excellent weathering properties as quantified by well accepted accelerated and natural weathering test methods and thermal crack resistance. Also, they offer advantageous curing rates and material compatibility.

The surface hardness of resin blend coating compositions as disclosed herein can be further improved with the addition of an acrylated organic-inorganic hybrid material, typically produced through a sol gel process. The preferred organic-inorganic hybrid is compromised of silica particles in the range of about 5 nm to about 100 nm that are spherical, non-porous and amorphous and a multifunctional acrylate with a molecular weight of about 200 to about 450 and at least two polymerizable unsaturated groups per molecule. The preferred final molecular weight the organic-inorganic hybrid is between about 500 and about 3000. Improved surface hardness properties can be achieved with additions of about 5% to about 35% by weight (exclusive of any inert solvent present) of such acrylated organic-inorganic hybrid materials. More preferably the content of the acrylated organic-inorganic hybrid, when included, is about 8% to about 18% by weight, exclusive of any inert solvent present. Examples of suitable organic-inorganic materials that can be used in compositions, coatings and coated articles of the invention include Etercure 601A-35, Etercure 601B-35, Etercure 601C-35, Etercure 601H-35, (Eternal Chemical Company, Ltd, Taiwan) and RX11402 (Cytec Surface Specialties, Smyrna, Ga.)

Coating compositions of the invention can also include one or a plurality of multifunctional acrylates. The multifunctional acrylate(s) employed in coating compositions of the invention will depend upon the desired application viscosity, application method and performance properties. Typical multifunctional acrylates are of the reactive diluent type having a molecular weight of about 170 to about 1000 and contain at least two polymerizable unsaturated groups per molecule. Representative multifunctional acrylates include dipropylene glycol diacrylate, triprolyene glycol diacrylate, 1,6-hexanediol diacrylate, pentaerythritol triacrylate, pentaerythritol tetra acrylate, tricyclodecane dimethanol diacrylate, di-trimethylolpropane tetraacrylate, dipentaertyhritol pentaacrylate, trimethylolpropane triacrylate, tetraethleneglycol diacrylate, and the like. The preferred coating composition includes two such multifunctional acrylates each in an amount of about 5% to about 55% by weight. In certain preferred embodiments, a coating composition of the invention will include about 5% to about 15% of a first such multifunctional acrylate with two polymerizable unsaturated groups per molecule and about 15% to about 25% of a second such multifunctional acrylate with three polymerizable unsaturated groups per molecule.

Many photoinitiators and/or sensitizers are suitable for use in coating compositions of the invention. Among the groups of suitable photoinitiators are dipenylphosphine oxide type photoinitiators such as 2,4,6-trimethylbenzoyl diphenylphosphine oxide and bis-2,4,6-trimethylbenzoyldiphenylphosphine oxide; phenylglyoxylate type such as oxyphenyl-acetic acid 2-[2 oxo-2 phenyl-acetoxy-ethoxy]-ethyl ester and oxy-phenyl-acetic 2-[2-hydroxy-ethoxy]-ethyl ester; α-hydroxyketone type such as 1-hydroxy-cyclohexyl-phenyl-ketone, 2-hydroxy-1-[4-(2-hydroxyethoxy) phenyl]-2-methyl-1-propanone, 2-hydroxy-2-methyl-1-pheyl-1-propanone, and difunctional α-hydoxyketones. The preferred embodiment includes a blend of diphenylphosphine oxide and α-hydroxyketone type photoinitiators with a more preferred blend of bis-2,4,6-trimethylbenzolydiphenylphosphine oxide and difunctional α-hydroxy-cyclohexyl-phenyl-ketone.

At least one photoinitiator is added to the preferred formulations in amounts sufficient to obtain the desired cure response. In preferred formulations of the invention, a blend of at least two photoinitiators is included in amounts of about 0.25% to about 15% by weight. The range of the first preferred photoinitiator (a diphenylphosphine oxide type as noted above) is about 0.5% to about 2.5% in certain embodiments. The range of the second preferred photoinitiator (an α-hydroxyketone type as noted above) is about 4% to about 13% in certain embodiments. In certain inventive formulations, a further benefit is gained by the addition of a third photoinitiator, for example a hydroxyalkylphenone type photoinitiator, in the range of about 0.5% to about 4.5%. The amounts of photoinitiator(s) included will vary based upon many factors such as the types of UV cure equipment, the UV equipment set up, cure rate and durability desired.

Preferred coating compositions of the invention also include stabilizing materials to maximize exterior durability and UV resistance. Suitable stabilizers include hindered amines and UV absorbers such as benzotriazole or benzotriazine derivatives. The amount of stabilizers in the system vary depending on application parameters and desired performance properties to maximize weatherability without sacrificing cure response and surface hardness. In more preferred compositions, the hindered amine is in the range of about 0.5% to about 4.5%, hydroxyphenyl benzotriazine (or other suitable compound) is in the range of about 2% to about 15% and an antioxidant is in the range of about 0.25% to about 2.0%.

Preferred coating compositions of the invention include one or more inert solvents. In certain embodiments, the compositions include a blend of inert solvents. Examples of suitable inert solvents include ester solvents such as ethyl acetate and butyl acetate; ketone solvents such as acetone and methyl ethyl ketone; alcohol solvents such as isopropyl alcohol and secondary butyl alcohol. The amount and type of solvent in the composition will vary depending on application method and equipment capabilities and preference. For example, in a flowcoat or curtain coat application, inert solvents should not be excessively aggressive to the base plastic of the molded article. In certain forms of the invention, the inert solvent content in the coating composition as a whole can range from 0% to 80% by weight with a preferred solvent content of 35% to 65% by weight.

Various other additives can also be included in coating compositions of the invention to further improve appearance and/or performance properties of the cured coating. Examples of suitable additives are reactive and non-reactive acrylic or silicone flow, slip and mar and leveling agents that assist in substrate wetting and leveling of the composition and phenolic based antioxidants that provide thermal and process stability. One particularly preferred additive is a polysilixoane solution, such as that commercially available under the tradename Byk 301 (BYK-CHEMIE, Wallingford, Conn.)

In certain preferred embodiments, a resin blend coating composition is provided that includes an inert organic solvent in an amount of about 10-50% by weight, a first aliphatic urethane acrylate as discussed above in an amount of about 3% to about 20% by weight, a second aliphatic urethane acrylate as discussed above in an amount of about 3% to about 20% by weight, a reactive diluent component in an amount of about 5% to about 30% by weight wherein the reactive diluent component includes one or more multifunctional acrylates, one or more photoinitiators, e.g. selected from those identified herein, and one or more light stabilizers, e.g. selected from those identified herein. More preferred compositions of this embodiment further include an antioxidant and a flow additive, e.g. as identified herein. In certain forms, in the preparation of the first aliphatic urethane acrylate, X of Formula I represents isocyanate groups. In other preferred forms, X of Formula I represents isocyanate group-containing radicals that also contain iminooxadiazine dione groups; or X of Formula I represents isocyanate group-containing radicals that also contain isocyanurate groups; or X of Formula I represents isocyanate group-containing radicals that also contain uretdione groups; or X of Formula I represents isocyanate group-containing radicals that also contain, urethane groups; or X of Formula I represents isocyanate group-containing radicals that also contain allophanate groups; or X of Formula I represents isocyanate group-containing radicals that also contain biuret groups; or X of Formula I represents isocyanate group-containing radicals that also contain oxadiazine trione groups. In these embodiments, the first aliphatic urethane acrylate, and the second aliphatic urethane acrylate, may also have any of the other characterizing features as disclosed herein.

Coating compositions of the invention can be applied to a selected article by various conventional coating methods such as conventional spray, HVLP spray, air assisted/airless spray, rotary atomization, flowcoat, curtain coat or rollcoat. Further, the coating compositions can be applied directly to the substrate or over a previously-cured or uncured coating. The desired film thickness of the cured film formed with coating compositions of the invention is about 3 microns to about 40 microns with the most preferred dry film thickness being about 5 microns to about 20 microns.

Once applied, the coating composition can be cured by irradiation with ultraviolet energy as is known to those skilled in the art. In this regard, the irradiation is continued until curing is complete, with preferred exposure times typically being less than 300 seconds and more preferably about 20 to about 100 seconds. Curing temperatures can range from room temperature to the heat distortion temperature of the substrate, while curing distances are typically between about 2 and 18 inches from the UV source achieving a minimum of about 100 mW/cm$^2$ of intensity.

An ultraviolet light source having a wavelength range of between about 180 nanometers and 450 nanometers is preferred for curing the topcoat. Acceptable light sources that emit ultraviolet energy include sunlight, sun lamps, LED lamps, carbon or xenon arc lamps, and mercury vapor lamps. More preferred examples of suitable light sources include electrode type arc lamps or electrodeless type microwave lamps equipped with mercury vapor type or metal halide type bulbs that provide strong UV energy output in the aforementioned range.

The most preferred irradiation is achieved through a series of medium to high pressure mercury lamps having an intensity of about 100 W/in to about 600 W/in and provides about 1500 to about 15000 mJ/cm$^2$ of UV energy in about 20 to about 75 seconds of exposure when measured with a suitable compact radiometer. More preferred energy outputs are about 3000 to about 8000 mJ/cm$^2$. It should be noted that intensity and energy measurement equipment vary depending on the bandwidths that they measure. When the aforementioned preferred coating compositions are processed under these described irradiation conditions, the final coatings provide a unique blend of properties that adequately protect the molded plastic article from environmental and chemical degradation under severe exposure conditions.

Figure 1:
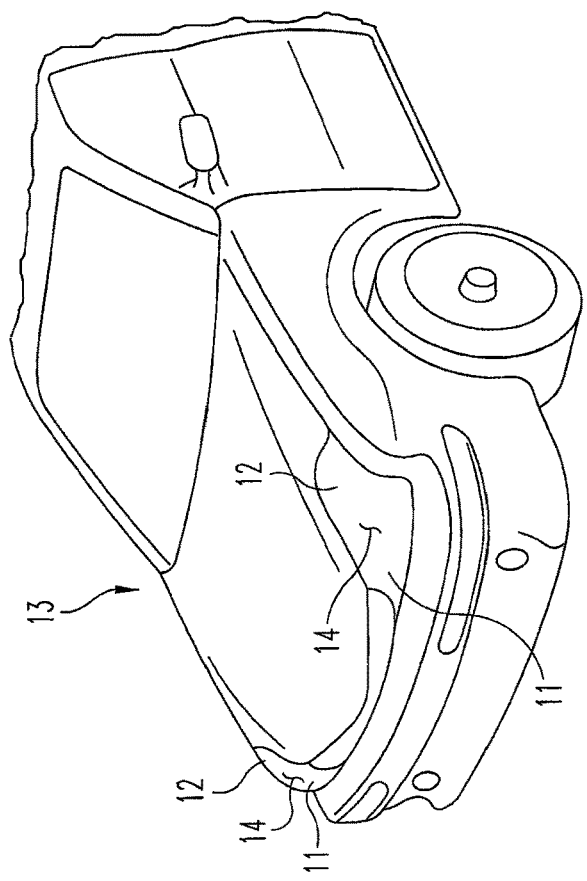
FIG. 1 provides a perspective partial cutaway illustration of a vehicle having a coated forward lighting lens according to one aspect of the invention.

In certain embodiments of the invention, coating compositions as described herein are used to form a coated article, especially a coated plastic article such as one made with polycarbonate or polyester. Preferred embodiments provide coated plastic lenses, and in particular forms coated, clear plastic lenses such as vehicle forward lighting lenses, e.g. made with polycarbonate. In this regard, with reference to FIGS. 1 and 2, shown is one embodiment of a coated vehicle forward lighting lens. Lens 11 is illustrative of a "wrapped lighting" lens in which the lens includes a significant upper component 12 that occurs in a non-vertical orientation (e.g. including at least about 10% of the total external surface area of the lens) and is designed into the hoodline of the vehicle 13, and thus is more directly exposed to incident radiation from sunlight. Such wrapped lenses have become common in current vehicles, and present challenges for coatings designed to provide UV protection to prevent yellowing due to sun exposure. In preferred inventive embodiments, the exterior surface 14 of the lens 11, including the exterior surface of the upper component 12, is topcoated with a UV-cured, clear coating composition of the invention. Additional embodiments of the present invention thus provide such coated forward vehicle lighting lenses as well as vehicles including them.

For the purpose of promoting a further understanding of the invention and certain embodiments thereof, the following Examples are provided. It will be understood that these Examples are illustrative, and not limiting, in nature.

Example 1

Preparation of UV Curable Blend Compositions

The components listed in Table 1 are combined using known techniques to form a UV curable resin blend composition including amounts of the first and second urethane acrylate resins as described hereinabove, along with multifunctional acrylates, photoinitiators, light stabilizers, an antioxidant and a flow improver. One or more inert solvents as described above can be included in the composition to alter its flow properties.

TABLE 1

| Component: | Weight Percent (exclusive of solvent) |
|---|---|
| First Urethane Acrylate Resin | 10-40% |
| Second Urethane Acrylate Resin | 20-50% |
| Multifunctional Acrylate #1 (functionality = 2) | 5-55% |
| Multifunctional Acrylate #2 (functionality = 3) | 5-55% |
| Photoinitiator #1 | 0.25-2.5% |
| Photoinitiator #2 | 4-9% |
| Photoinitiator #3 | 0.5-4% |
| Hindered Amine Light Stabilizer | 0.5-4.5% |
| Benzotriazine Absorber | 2-15% |
| Antioxidant | 0.25-2.0% |
| Flow Additive | 0.1-5.0% |

Example 2

Preparation of UV Curable Blend Compositions

The components listed in Table 2 are combined using known techniques to form a UV curable resin blend composition including amounts of the first and second urethane acrylate resins as described hereinabove, along with multifunctional acrylates, photoinitiators, light stabilizers, an antioxidant and a flow improver. One or more inert solvents as described above can be included in the composition to alter its flow properties.

TABLE 2

| Component: | Weight Percent (exclusive of solvent) |
|---|---|
| First Urethane Acrylate Resin | 10-40% |
| Second Urethane Acrylate Resin | 20-50% |
| Organic-Inorganic Hybrid Acrylate | 5-35% |
| Multifunctional Acrylate #1 (functionality = 2) | 5-55% |
| Multifunctional Acrylate #2 (functionality = 3) | 5-55% |
| Photoinitiator #1 | 0.25-2.5% |
| Photoinitiator #2 | 4-13% |
| Hindered Amine Light Stabilizer | 0.5-4.5% |
| Benzotriazine Absorber | 2-15% |
| Antioxidant | 0.25-2.0% |
| Flow Additive | 0.1-5.0% |

Example 3

Preparation of a Preferred UV Curable Coating Composition

The following components are introduced into a stainless steel container and all components are mixed under agitation until a homogenous mixture is formed.

| Formulation A: | Parts by Weight |
|---|---|
| Isopropanol | 42.5 |
| Secondary butyl alcohol | 12.0 |
| Desmolux VP LS2308 (Bayer) functionality ca. 3.8 | 12.0 |
| Ebecryl 8301 (Cytec), functionality ca. 6. | 12.3 |
| Trimethylolpropane triacrylate | 9.0 |
| SR833S (Sartomer) | 3.5 |
| Irgacure 819 (Ciba) | 0.55 |
| Irgacure 2959 (Ciba) | 2.7 |
| Irgacure 127 (Ciba) | 1.1 |
| Tinuvin 123 (Ciba) | 0.8 |
| CGL 0777 MPA (Ciba) | 4.0 |
| Irganox 1035 (Ciba) | 0.25 |
| Byk 301 (Byk-Chemie) | 0.30 |

Example 4

Preparation of Coated Plastic Article by Flowcoat Method

Formulation A of Example 3 is further reduced with a non-aggressive inert solvent to achieve a specific gravity that will result in desirable film thickness range upon cure. The preferred specific gravity is in the range of less than about 0.975. Coating is applied to an injection molded polycarbonate lens mounted on a fixture by a flowcoat method in which coating is applied only to the top and side surfaces of the lens. The wet coated lens is subjected to a short ambient flash followed by a convection heated air flash to evaporate solvent. The wet coated lens is then exposed to irradiation with a 240 W/cm standard mercury lamp at intensity of about 450 mW/cm² in air resulting in a coated article with a coating dry film thickness of about 8-12 microns.

The produced coated lens has properties of high optical clarity as well as superior performance properties as described below in TABLE 1:

TABLE 1

| Evaluation Test | Performance Result |
|---|---|
| Initial Adhesion per ASTM D3359 | OK |
| Scratch and Abrasion Testing including: | |
| Steel Wool per FMVSS108 | Minor Scratching |
| Taber Abrasion per ASTM D1044 | OK |
| Moisture Resistance Testing including: | |
| 60° C. Water Immersion × 240 hrs | OK |
| 50° C. Humidity Cabinet × 240 hrs | OK |
| Hydrolysis Testing | OK |
| Cycle Testing including: | |
| Moisture-Cold Cycle Testing × 15 | OK |
| Thermal Cycle Testing × 15 | OK |
| Thermal Shock | OK |
| Chemical Testing including: | |
| Brake fluid | OK |
| Motor oil | OK |
| Unleaded gasoline | OK |
| Antifreeze | OK |
| Windshield washer fluid | OK |
| Car wash concentrate | OK |
| Accelerated Weathering Testing including: | |
| Xenon Arc with Daylight Filtration | OK - currently to 5000 hrs |
| Sunshine Carbon Arc | OK - currently to 3000 hrs |
| Natural Weathering Testing including: | |
| Florida 5° and 45° Exposure angles | OK - currently to 3 years |
| Arizona 5° and 45° Exposure angles | OK - currently to 3 years |

Example 5

Alternative Preferred UV Curable Coating with Further Improved Surface Hardness

The following components are introduced into a stainless steel container and all components are mixed under agitation until a homogenous mixture is formed.

| Formulation B: | Parts by Weight |
|---|---|
| Isopropanol | 40.8 |
| Secondary butyl alcohol | 10.6 |
| Desmolux VP LS2308 (Bayer) functionality ca. 3.8 | 10.2 |
| Ebecryl 8301 (Cytec), functionality ca. 6. | 12.8 |
| Etercure 601C-35 (Eternal) | 4.4 |
| Trimethylolpropane | 8.0 |

-continued

| Formulation B: | Parts by Weight |
|---|---|
| triacrylate | |
| SR833S (Sartomer) | 3.5 |
| Irgacure 819 (Ciba) | 0.55 |
| Irgacure 127 (Ciba) | 3.8 |
| Tinuvin 123 (Ciba) | 0.8 |
| CGL 0777 MPA (Ciba) | 4.0 |
| Irganox 1035 (Ciba) | 0.25 |
| Byk 301 (Byk-Chemie) | 0.3 |

Example 6

Preparation of Coated Plastic Article by Spray Method

Formulation B of Example 5 is applied to an injection molded polycarbonate lens by a spray method using a conventional spray gun mounted on a robot. A programmed spray pattern is used to achieve consistent coverage of the coating and cured dry film thickness in the range of 8 to 12 microns. The wet coated lens is subjected to heated convection air to evaporate solvent prior to an irradiation with a 240 W/cm standard mercury lamp at intensity of about 450 mW/cm² in air.

Evaluation of Formulation B is described below in TABLE 2:

TABLE 2

| Evaluation Test | Performance Result |
|---|---|
| Initial Adhesion per ASTM D3359 | OK |
| Scratch and Abrasion Testing including: | |
| Steel Wool per FMVSS108 | Negligible Scratching |
| Taber Abrasion per ASTM D1044 | OK |
| Moisture Resistance Testing including: | |
| 60° C. Water Immersion × 240 hrs | OK |
| 50° C. Humidity Cabinet × 240 hrs | OK |
| Hydrolysis Testing | OK |
| Cycle Testing including: | |
| Moisture-Cold Cycle Testing × 15 | OK |
| Thermal Cycle Testing × 15 | OK |
| Thermal Shock | OK |
| Chemical Testing including: | |
| Brake fluid | OK |
| Motor oil | OK |
| Unleaded gasoline | OK |
| Antifreeze | OK |
| Windshield washer fluid | OK |
| Car wash concentrate | OK |
| Accelerated Weathering Testing including: | |
| Xenon Arc Daylight Filtration | OK - currently to 5000 hrs |
| Sunshine Carbon Arc | OK - currently to 3000 hrs |

TABLE 2-continued

| Evaluation Test | Performance Result |
|---|---|
| Natural Weathering Testing including: | |
| Florida 5° and 45° Exposure angles | OK - currently to 3 years |
| Arizona 5° and 45° Exposure angles | OK - currently to 3 years |

The above examples demonstrate that preferred UV curable compositions of the invention, when applied to a molded article and UV cured, will provide enhanced chemical and durability properties. It should be understood, however, that modifications can be made to adapt the invention to similar uses without changing the principle features.

The uses of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. In addition, all publications cited herein are hereby incorporated by reference in their entirety.

What is claimed is:

1. A UV curable coating composition, comprising:
   (1) an inert solvent;
   (2) a first aliphatic urethane acrylate resin, which is a reaction product of a polyisocyanate component represented by formula I below with an alcohol component containing at least one monobasic, hydroxy-functional, linear or branched $C_1$-$C_{12}$ alkyl ester of (meth)acrylic acid:

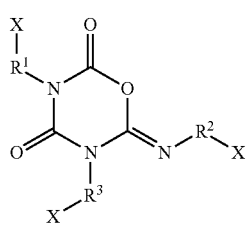

wherein $R^1$, $R^2$, and $R^3$ of formula I are the same or different, and each comprise linear or branched, $C_4$-$C_{20}$ (cyclo)alkyl groups, wherein X is the same or different and comprises isocyanate groups and wherein $R^1$, $R^2$, and $R^3$ of formula I are attached to a nitrogen atom;

(3) a second aliphatic urethane acrylate resin comprising the structure of formula II:

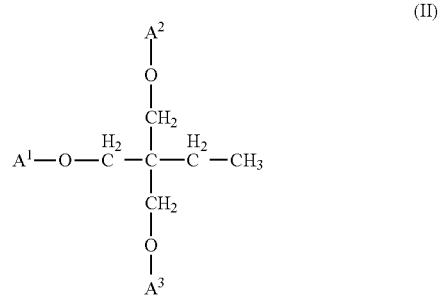

wherein $A^1$, $A^2$, and $A^3$ are each a group comprising the structure of formula III:

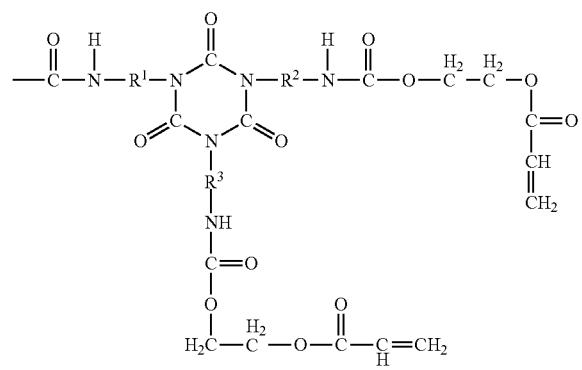

wherein $R^1$, $R^2$, and $R^3$ of formula III are the same or different, and each comprise a linear aliphatic group having from 2 to 12 carbon atoms, or a cycloaliphatic group having from 4 to 12 carbon atoms, wherein the second urethane acrylate has an average molecular weight of 500 to 2,000, wherein the second urethane acrylate resin contains 6 polymerizable acrylate groups per molecule, and wherein the first aliphatic urethane acrylate resin and the second aliphatic urethane acrylate resin comprise a weight ratio of 1:3 to 3:1;
   (4) a first multifunctional acrylate, wherein the first multifunctional acrylate has an average molecular weight of 170 to 1,000, and wherein the first multifunctional acrylate comprises two polymerizable unsaturated groups per molecule;
   (5) a second multifunctional acrylate, wherein the second multifunctional acrylate is selected from at least one of pentaerythritol triacrylate and trimethylolpropane triacrylate;
   (6) a first photoinitiator and a second photoinitiator, wherein the first and second photoinitiators are selected from the group consisting of diphenylphosiphine oxides, pheylglyoxylates, α-hydroxyketones, difunctional α-hydroxyketones and combinations thereof;
   (7) a hindered amine light stabilizer;
   (8) a UV absorber comprising at least one of a benzotriazole and a benzotriazine;

(9) an acrylated organic-inorganic hybrid material;
(10) a phenolic based antioxidant; and
(11) a flow additive.

2. The composition according to claim 1, wherein, exclusive of the solvent, the composition comprises 10% to 40% by weight of the first aliphatic urethane acrylate resin and 20% to 50% by weight of the second aliphatic urethane acrylate resin.

3. A UV curable coating composition, comprising:
(1) a solvent;
(2) a first aliphatic urethane acrylate resin, which is a reaction product of a polyisocyanate component represented by formula I below with an alcohol component containing at least one monobasic, hydroxy-functional, linear or branched $C_1$-$C_{12}$ alkyl ester of (meth)acrylic acid:

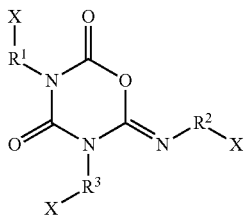
(I)

wherein $R^1$, $R^2$, and $R^3$ of formula I are the same or different, and each comprise linear or branched, $C_4$-$C_{20}$ (cyclo)alkyl groups, wherein X is the same or different and comprises isocyanate groups and wherein $R^1$, $R^2$, and $R^3$ of formula I are attached to a nitrogen atom;

(3) a second aliphatic urethane acrylate resin comprising the structure of formula II:

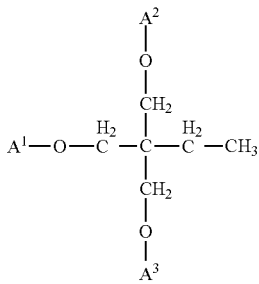
(II)

wherein $A^1$, $A^2$, and $A^3$ are each a group comprising the structure of formula III:

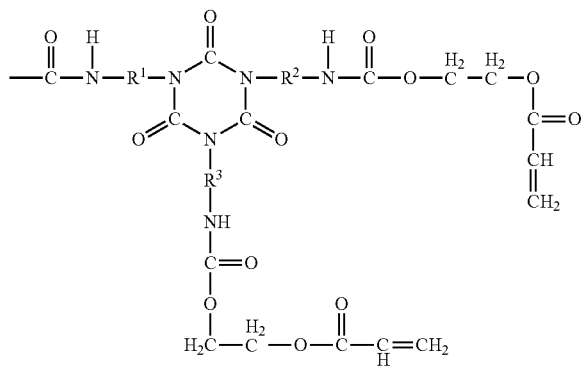

wherein $R^1$, $R^2$, and $R^3$ of formula III are the same or different, and each comprise a linear aliphatic group having from 2 to 12 carbon atoms, or a cycloaliphatic group having from 4 to 12 carbon atoms, wherein the second urethane acrylate has an average molecular weight of 500 to 2,000, wherein the second urethane acrylate resin contains 6 polymerizable acrylate groups per molecule, and wherein the first aliphatic urethane acrylate resin and the second aliphatic urethane acrylate resin comprise a weight ratio of 1:3 to 3:1;

(4) a first multifunctional acrylate, wherein the first multifunctional acrylate has an average molecular weight of 170 to 1,000, and wherein the first multifunctional acrylate comprises two polymerizable unsaturated groups per molecule;

(5) a second multifunctional acrylate, wherein the second multifunctional acrylate is selected from at least one of pentaerythritol triacrylate and trimethylolpropane triacrylate;

(6) a photoinitiator;

(7) a hindered amine light stabilizer; and (8) a UV absorber.

4. The composition according to claim 3, wherein, exclusive of the solvent, the composition comprises 10% to 40% by weight of the first aliphatic urethane acrylate resin and 20% to 50% by weight of the second aliphatic urethane acrylate resin.

* * * * *